M. WEIXLER.
BELT FASTENER.
APPLICATION FILED MAR. 8, 1909.
965,777.
Patented July 26, 1910.
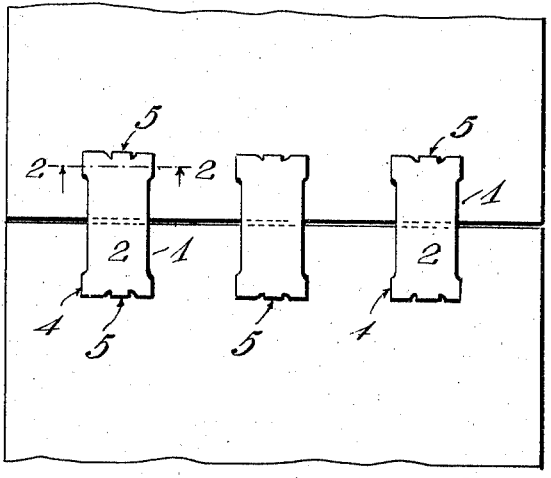
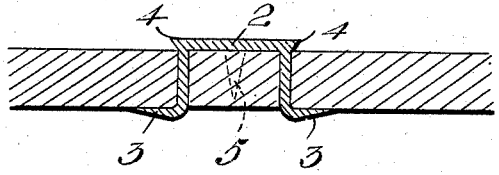
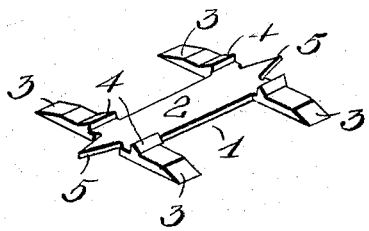
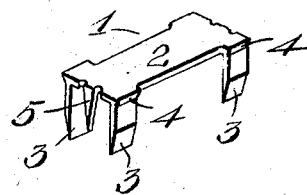
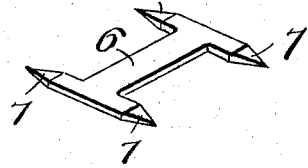
Witnesses
Inventor
M. Weixler
by H. B. Willson & Co.
Attorneys

UNITED STATES PATENT OFFICE.

MATHIAS WEIXLER, OF LOUISVILLE, KENTUCKY.

BELT-FASTENER.

965,777.  Specification of Letters Patent.  Patented July 26, 1910.

Application filed March 8, 1909. Serial No. 482,094.

*To all whom it may concern:*

Be it known that I, MATHIAS WEIXLER, a citizen of the United States, residing at Louisville, in the county of Jefferson and State of Kentucky, have invented certain new and useful Improvements in Belt-Fasteners; and I do declare the following to be a full, clear, and exact description of the invention, such as will enable others skilled in the art to which appertains to make and use the same.

This invention relates to improvements in belt fasteners.

The object of the invention is to provide a belt fastener having attaching prongs which penetrate the belt longitudinally or lengthwise of the same thus preventing the weakening of the belt and also placing the strain on the edge of the prongs instead of transversely thereof.

Another object is to provide a belt fastener having its prongs beveled on one side toward the outer ends whereby they will lie flat when clenched against the belt.

Another object is to provide means whereby the attaching prongs of the belt fastener are reinforced at the point where they are bent from the body portion of the fastener.

With these and other objects in view the invention consists of certain novel features of construction, combination and arrangement of parts, as will be more fully described and particularly pointed out in the appended claims.

In the accompanying drawings, Figure 1 is a plan view of the meeting ends of a belt showing same connected together with my improved fastener. Fig. 2 is a longitudinal sectional view of the same. Fig. 3 is a perspective view of a blank from which the fastener is formed. Fig. 4 is a similar view of the finished fastener. Fig. 5 is a perspective view of the blank for a modified form of the fastener for use on light belts.

Referring more particularly to the drawings 1 denotes the fastener which is cut or stamped from a sheet of metal and consists of a body portion 2 at each end of which are formed laterally-projecting belt-engaging prongs 3. On the prongs adjacent to their connection with the body portion 2 and at the point where said prongs are bent at right angles to the body portion is formed a reinforcing projection 4 which permits the prongs to be bent at right angles to form sharp square corners without danger of breaking the prong off from the body portion.

The prongs 3 are preferably beveled on one side toward their outer end so that after the prongs have been forced through the belt and clenched on the opposite side thereof they will form only slight projections. The beveled end of the prongs also greatly facilitates the insertion of the same through the belt when engaged therewith. By arranging the prongs as herein shown and described they will, when inserted through the belt, penetrate the same longitudinally thereby weakening the belt to a much less extent than they would if inserted through the belt cross-wise. By inserting the prongs through the belt lengthwise the strain is also applied to the edge of the prongs instead of transversely thereof thus decreasing the danger of the prongs becoming straightened out and pulled out of engagement with the belt. In addition to the prongs 3 I also provide supplementary fastening prongs 5 which are arranged at the center of each end of the body portion 2 and are preferably pointed as shown. The supplementary barbs or prongs 5 are employed in connection with fasteners used for heavy belts or where there is a possibility of the prongs 3 being broken or pulled out of engagement with the belt.

In Fig. 5 of the drawing is shown a slightly modified form of the fastener 6, the latter being shown in this instance as having simply the laterally-projecting prongs 7 which are tapered on one side in the same manner as the prongs 3 shown in Fig. 1 of the drawing and which also are preferably pointed, as shown. In the last form of fastener the reinforcing projections are dispensed with. This form of fastener is designed for use in connection with thin belts for use on light running machinery.

In applying the fasteners to the belt the prongs 3 and 7 after being inserted through the belt are preferably bent outwardly in opposite directions to clench the same through the belt while the prongs 5 are bent inwardly toward each other.

By bending the prongs of the fasteners outwardly the fasteners do not stiffen the belt to the extent they would should the prongs be bent inwardly or toward each other.

In using the fasteners any number of same may be employed to secure the meeting ends of the belt together, the number of fasteners required depending altogether on the width of the belt and the strain to be applied thereto.

From the foregoing description, taken in connection with the accompanying drawings, the construction and operation of the invention will be readily understood without requiring a more extended explanation.

Various changes in the form, proportion and minor details of construction may be resorted to without departing from the principle or sacrificing any of the advantages of this invention as defined in the appended claim.

I claim as my invention:

A belt fastener comprising a flat metal plate having opposite laterally projecting prongs formed at opposite ends thereof and adapted to be bent downwardly at right angles thereto, said prongs being tapered and pointed at their outer ends, substantially V-shaped reinforcing ribs extending transversely across the upper side of the prongs at the point of their juncture with the plate and having their base overlapping the line of bend on the plate and prong sides, so as to strengthen the prongs where the same are bent, and longitudinally extending prongs at the ends of the body adapted to be bent at right angles thereto.

In testimony whereof I have hereunto set my hand in presence of two subscribing witnesses.

MATHIAS WEIXLER.

Witnesses:
GEORGE J. EGNER,
JOHN ZIEGLER.